Jan. 26, 1926.
M. D. DOMINGUEZ
1,570,624
BUMPER FOR VEHICLES
Filed Oct. 21, 1924   2 Sheets-Sheet 1
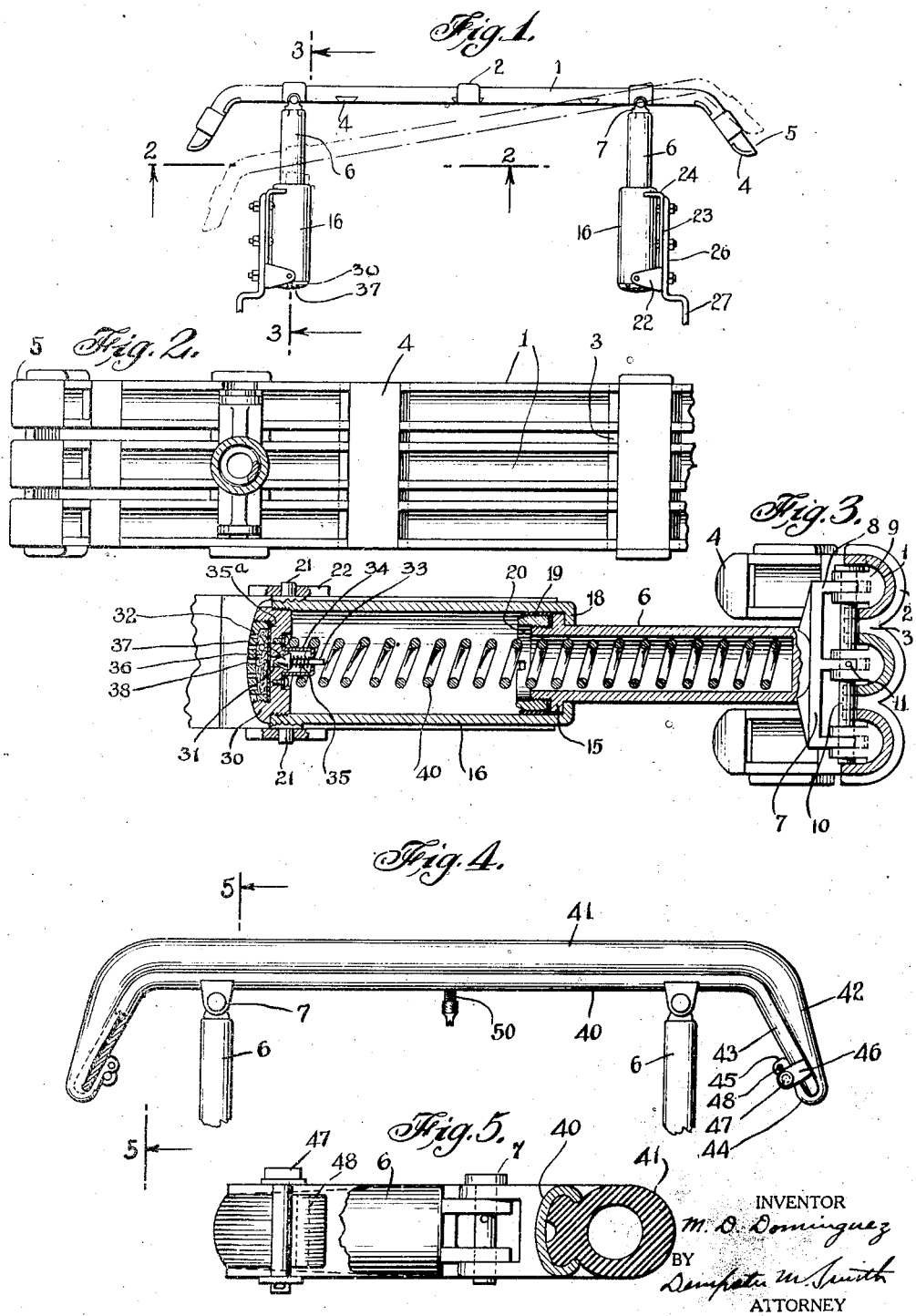
INVENTOR
M. D. Dominguez
BY
ATTORNEY Jan. 26, 1926.                                                           1,570,624
                          M. D. DOMINGUEZ
                        BUMPER FOR VEHICLES
                       Filed Oct. 21, 1924          2 Sheets-Sheet 2
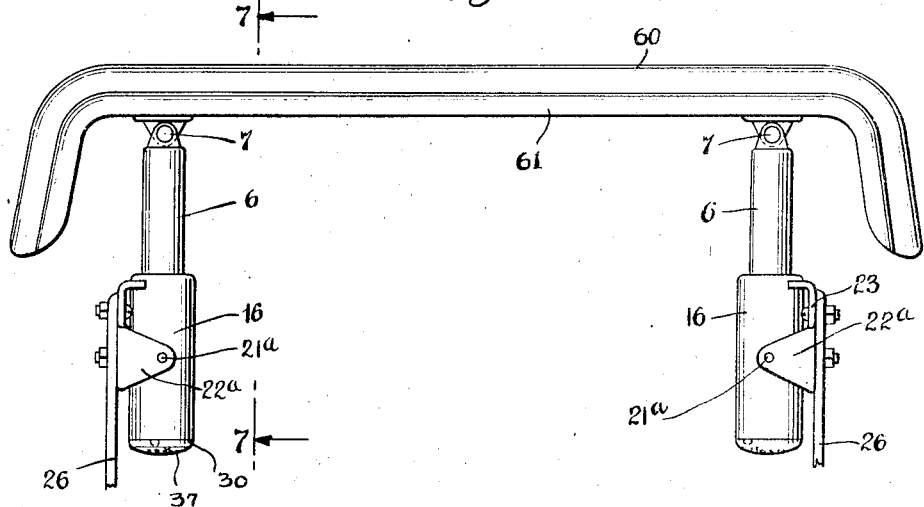
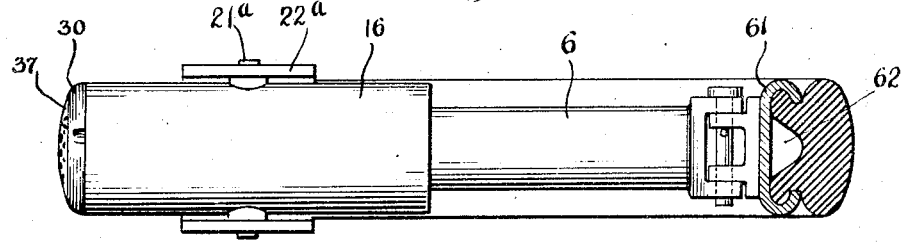
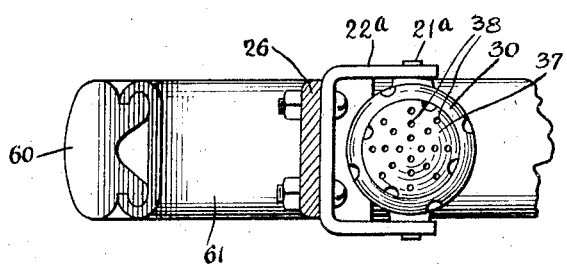
INVENTOR
Manuel D. Dominguez
BY
Dempster M. Smith
ATTORNEY Patented Jan. 26, 1926.

1,570,624

UNITED STATES PATENT OFFICE.

MANUEL D. DOMINGUEZ, OF NEW ORLEANS, LOUISIANA.

BUMPER FOR VEHICLES.

Application filed October 21, 1924. Serial No. 744,936.

*To all whom it may concern:*

Be it known that I, MANUEL D. DOMINGUEZ, a citizen of Spain, and resident of New Orleans, in the parish of Orleans and State of Louisiana, have invented certain new and useful Improvements in Bumpers for Vehicles, of which the following is a specification.

My invention relates to devices usually known as bumpers, used on vehicles to absorb more or less of the force of impact of the vehicle with another object, for the purpose of protecting the vehicle itself or the object struck, from damage or injury. Structures embodying my invention may be employed upon various types of vehicles including rail vehicles, but in the physical embodiments chosen for illustration, the appliances are more particularly designed for use on motor vehicles and will be so described, with the understanding that the appliances may be otherwise utilized with or without modification, within the scope of the appended claims.

A more important object of the invention is to yieldingly support the impact bar, and preferably, to so support it that it will properly react to shocks occurring at any portion of its length. The yielding support includes provision for a fluid cushioning medium, and an element such as a spring, co-operating with the fluid medium to resist movement of the bumper bar under impact and to return it to normal position thereafter.

A further object is to provide an impact bar with a cushioned face to further reduce the shock of impact either to the vehicle on which the appliance is mounted or to the object causing the impact. This feature of the invention may take the form of a simple resilient cushion strip applied to the front face of the impact bar, or it may have a pneumatic action analogous to that of a pneumatic tire.

The characteristics and advantages of the invention are further sufficiently explained in connection with the following detail description of the accompanying drawings, which show certain representative embodiments of the invention. After considering these, persons skilled in the art will understand that many variations may be made within the principles of the invention, and I contemplate the employment of any structures that are properly within the scope of the appended claims.

Fig. 1 is a plan view of a bumper structure embodying the invention in one form.

Fig. 2 is a fragmentary section, enlarged, in the plane 2—2, Fig. 1.

Fig. 3 is a section, enlarged, in the plane 3—3, Fig. 1.

Fig. 4 is a plan view of a modified impact bar provided with a cushion face.

Fig. 5 is an enlarged section at 5—5, Fig. 4.

Fig. 6 is a plan view of another modified bumper structure.

Fig. 7 is a section at 8—8, Fig. 6.

Fig. 8 is a rear elevation, enlarged, of the left hand portion of Fig. 6.

Referring first to Figs. 1 to 3: The impact element proper may consist of one or a plurality of bars 1 of channel or C-section, and when the term impact bar is used hereafter, without evident limitation, it is broad enough to include the multiple bar, consisting in the present specific example of three of the bars 1. The individual bars may be spaced apart and secured in various ways. Particularly, in the present example, they are so spaced and secured by outside vertical spacing strips 2, which have portions 3 intermediate adjacent bars to properly separate them. The spacing connectors 2 may be welded or otherwise suitably secured to the bars. The bars may be additionally connected or secured to inner vertical strips 4 having dove-tail engagement with the bar flanges and these strips may be welded or otherwise secured in position. Near their ends the bars are curved or bent back at an angle to aid in deflecting objects which encounter these end portions 5.

Near each end the impact bar has an articulated connection with a movable support 6 which, in the present example, is a tubular piston rod. At the outer end this rod has a head 7 provided with a plurality of eyes 8 fitting in clevised lugs 9 secured in the bars 1 by welding or otherwise. A pivot pin 10 passes through the eyes and clevised members and is secured by a retaining pin 11. Evidently all but the center one of the impact bars might be omitted and the head 7 would then have a single eye to correspond with the clevised lug 9 of that bar.

Each hollow piston rod 6 has, near its inner end, a flange 15 fitting in a cylinder 16, which has at its outer end an inturned flange 18 to limit outward movement of the piston rod. A cup packing or washer 19 of leather or other suitable material is held against flange 15 by a nut 20. The packing has a cylindrical portion closely fitting the bore and cylinder 16. Each cylinder is provided with vertically extending trunnions 21 which have bearing mountings in arms 22 of bracket 23, which may be referred to for identification as a sub-bracket. At its front end, the sub-bracket has an inbent portion 24, the inner edge of which has a curved contour to conform to the shape of cylinder 16 and form a socket therefor. The sub-bracket is bolted or otherwise secured to another bracket 26 which may be identified as the main bracket. This is of sheet metal of suitable thickness and its rearward portion 27 may be bent or otherwise formed in any suitable way for convenient connection to a vehicle frame member.

A plug or head 30 is screwed into the rear end of each cylinder 16. At the center of this head is an air passage 31 normally closed by a conical check valve 32 which has a stem 33 guided by a cage 34 which is connected to the head 30. A spring 35 holds the valve normally in closed position. It is desirable in some cases to prevent dust and grit from entering the cylinder. For this purpose a packing or filter is provided as follows: The rear face of the head 30 is recessed and in the bottom of this recess is located a perforated or wire mesh screen 35ª. Upon the screen is placed a filter packing 36 of suitable fibrous material, such as raw cotton, felt or the like. This filter material is retained by a nut or cap 37 screwed into the wall of the head recess and provided with a multiplicity of perforations 38.

A helical spring 40 is located under suitable initial compression within the cylinder and the hollow rod 6 with its ends bearing respectively against head 30 and the outer end of the rod. The inward end of the spring conveniently fits around cage 34 by which it is prevented from lateral dislocation.

A body of air is normally confined at atmospheric pressure in the chamber formed by cylinder 16 and its hollow rod 6. When the impact structure encounters an obstacle with any considerable force, either or both of the piston rods 6 move rearward against the resistance provided by the spring 40 and by the compression of the air body, aided by the heating of the air due to compression, which amplifies the resisting force. The piston has a relatively long stroke so that a very heavy impact may be resisted with yielding force, and except in extreme cases, without damage to the vehicle on which the appliance is mounted or the object encountered. Usually the entire air body is retained in the chamber; otherwise, in some cases, a slight relief to the pneumatic resistance may be provided by making a scratch in the surface of valve 32 or its seat. In any case, if, upon rearward movement of the piston rod any air escapes from the cylinder, it is automatically replenished by the return movement of the piston under the impulse of spring 40, valve 32 opening during this movement against its spring to permit air to enter through the hole 31. This air is filtered by the packing 36 and all or substantially all of the dust or grit in the air is thus removed and prevented from setting up abrasive action in the cylinder.

If the impact occurs near the center of the impact bar, the bar will move back in parallel relation to its original position and without deflection of either cylinder. If, however, the impact occurs considerably to one side of the center or near one end of the bar, the bar will deflect angularly as indicated in dotted lines, Fig. 1, by the impact occurring near the left hand end of the bar. The right hand cylinder 16 in this case will deflect very little or not at all, and the bar pivots at its point of articulation with head 7 of the right hand piston rod 6. The bar also pivots at its point of articulation with the other piston rod head, and as the piston moves in and the bar assumes the angular position shown in dotted lines, the left hand cylinder 16 swings inward on its trunnions 21, as also indicated in dotted lines in Fig. 1. In this way ample angular or lateral flexibility is provided, in addition to straight longitudinal yielding or flexibility, in accordance with the direction of the force of the impact.

Figs 4 and 5 illustrate a modification in which any suitable plurality of bumper bar members may be provided with a face cushion. A single bumper bar 40 is illustrated, which has the cross-sectional form, substantially, of an ordinary wheel clincher rim, to receive a cushioning structure 41, which may be substantially identical with any suitable pneumatic tire structure, either single or double tube. A single tube form is represented for the sake of simplicity. This pneumatic cushion extends along the straight outer face of the bumper bar 40 and has portions 42 extending along the outer faces of the rearwardly curved bar portions 43. The cushion portions 42 may taper toward their ends 44 which may be of solid construction and are bent around the ends of the bar portions 43 and terminate in eye or lug members 45. The cushion portions 44 are clamped to the bar ends by clips 46. Pins 47 pass through the clip ends overlying the cushion ends. Pins 48 are passed through the end lugs 45 of the cushion end portions 44 and by co-operation with the clips positively prevent the cushion ends from pulling away from the clips. Air under suitable pressure is introduced into the interior of the pneumatic cushion through a suitable valve 50, which may be a typical pneumatic tire valve, passing through the bar 40 at a convenient point to permit inflation of the cushion. The bar structure may be supported substantially in the same fashion as described in connection with Figs. 1 to 3.

In addition to the resilient resistance provided by the pneumatic or spring mounting of the bumper bar, the cushion face structure or pneumatic cushioning element 41 still further absorbs shocks of impact in an obvious manner.

Figs. 6, 7 and 8 illustrate another modification in which the pneumatic cushion just referred to is replaced by a non-pneumatic cushion bar facing 60. This may be of the cross-sectional form of a typical cushion tire and to properly receive the cushion element, the bar 61 may have the cross-sectional form of a clincher wheel rim or may be otherwise shaped to receive the cushion facing, which is of any suitable rubber or rubber composition and may be reinforced with canvas, in accordance with the known principles of cushion tire construction. Desirably the cushion strip is formed with a base chamber 62 to increase the flexibility of the cushion. These figures also show a modified mounting of the cylinders 16, consisting in locating the trunnions 21ª substantially at mid-length of the cylinders. The pivotal movement of the cylinders is thus modified in an obvious way. Other parts of the mounting may be substantially as described in connection with Figs. 1 to 3, except that the arms 22ª of sub-bracket 23 are properly located to correspond with the location of the trunnions.

I claim:

1. A vehicle bumper structure comprising an impact bar of clincher cross-section and a cushion of resilient material extending along the outer face of the bar and having a base formation co-operating with the clincher form of the bar to hold the cushion in position, the ends of the cushion being lapped around the ends of the bar and firmly secured thereto.

2. A vehicle bumper structure comprising an impact bar of clincher cross-section and a cushion of resilient material extending along the outer face of the bar and having a base formation co-operating with the clincher form of the bar to hold the cushion in position, said cushion having a hollow interior filled with air under pressure, the ends of the cushion being lapped around the ends of the bar and firmly secured thereto.

3. A vehicle bumper structure comprising an impact bar, brackets adapted for connection to vehicle frame members, bar supports pivotally connected to the brackets and the bar, each support including a longitudinally yieldable member, and a chamber containing a fluid body to co-operate with the yieldable member.

4. A vehicle bumper structure comprising an impact bar, brackets adapted for connection to vehicle frame members, bar supports pivotally connected to the brackets and the bar, each support including a longitudinally yieldable member, a chamber containing a fluid body to co-operate with the yieldable member, and a check valve acting to retain fluid in the chamber and to admit fluid to replace leakage from the chamber.

5. A vehicle bumper structure comprising an impact bar, brackets adapted for connection to vehicle frame members, bar supports pivotally connected to the brackets and the bar, each support including a longitudinally yieldable member, a spring normally urging said member to outward position, and a chamber containing an air body to co-operate with the yieldable member.

6. A vehicle bumper structure comprising an impact bar, brackets adapted for connection to vehicle frame members, bar supports pivotally connected to the brackets and the bar, each support including a longitudinally yieldable member, a spring normally urging said member to outward position, a chamber containing an air body to co-operate with the yieldable member, and a check valve acting to retain air in the chamber and to admit air to replace leakage from the chamber.

7. A vehicle bumper structure comprising an impact bar, and a support therefor including a cylinder adapted to retain a cushioning body of fluid, a piston acting within the cylinder on the fluid body, a spring urging the piston to outward position, and a check valve at one end of the cylinder tending to retain fluid therein and to admit external fluid to replace leakage.

8. A vehicle bumper structure comprising an impact bar, and a support therefor including a cylinder adapted to retain a cushioning body of air, a piston acting within the cylinder on the air body, a spring urging the piston to outward position, a check valve at one end of the cylinder tending to retain air therein and to admit external air to replace leakage, and means for filtering air entering the cylinder to remove foreign matter therefrom.

9. In a bumper structure, an impact bar, a supporting member pivotally connected thereto, a guide member in which the supporting member is slidably supported, and a bracket in which the guide member is pivotally mounted.

10. In a bumper structure, an impact bar, a supporting member pivotally connected thereto, a guide member in which the supporting member is slidably supported, and a bracket in which the guide member is pivotally mounted, said bracket being arranged for connection to a vehicle frame member.

11. In a bumper structure, an impact bar, a supporting member pivotally connected thereto, a guide member in which the supporting member is slidably supported, and a bracket in which the guide member is pivotally mounted, said bracket being arranged for connection to a vehicle frame member, the bracket also having a supporting socket for the guide member.

12. In a bumper structure, an impact bar, a supporting tubular piston rod pivotally connected thereto, a cylinder in which the piston is slidably supported, and a bracket in which the cylinder is pivotally mounted.

13. In a bumper structure, an impact bar, a supporting tubular piston rod pivotally connected thereto, a cylinder in which the piston is slidably supported, and a bracket in which the cylinder is pivotally mounted, said bracket being arranged for connection to a vehicle frame member.

14. In a bumper structure, an impact bar, a supporting tubular piston rod pivotally connected thereto, a cylinder in which the piston is slidably supported, and a bracket in which the cylinder is pivotally mounted, said bracket being arranged for connection to a vehicle frame member, the bracket also having a supporting socket for the guide member.

15. In a bumper structure, an impact bar, a supporting tubular piston rod pivotally connected thereto, a cylinder in which the piston is slidably supported, a bracket in which the cylinder is pivotally mounted, and a spring within the cylinder and piston rod urging the latter toward outward position.

16. In a bumper structure, an impact bar, a supporting tubular piston rod pivotally connected thereto, a cylinder in which the piston is slidably supported, a bracket in which the cylinder is pivotally mounted, a spring within the cylinder and piston rod urging the latter toward outward position, a fluid port in the inner end of the cylinder, and a check valve normally closing the port to retain fluid in the cylinder but acting automatically to admit fluid to replace leakage.

17. In a bumper structure, an impact bar, a supporting tubular piston rod pivotally connected thereto, a cylinder in which the piston is slidably supported, a bracket in which the cylinder is pivotally mounted, a spring within the cylinder and piston rod urging the latter toward outward position, an air port in the inner end of the cylinder, a check valve normally closing the port to retain air in the cylinder but acting automatically to admit air to replace leakage, and a filter packing arranged to remove foreign matter from air entering the port.

Signed at New Orleans in the parish of Orleans and State of Louisiana this 16th day of October A. D. 1924

MANUEL D. DOMINGUEZ